(12) United States Patent
Dereani et al.

(10) Patent No.: US 8,998,465 B2
(45) Date of Patent: Apr. 7, 2015

(54) METHOD FOR INJECTION MOULDING OF PLASTIC-MATERIAL LENTICULAR BODIES FOR LIGHTS OF MOTOR VEHICLES AND SIMILAR, AND LENTICULAR BODY FOR LIGHTS OF MOTOR VEHICLES AND SIMILAR

(75) Inventors: Daniele Dereani, Venaria Reale (IT); Franco Marcori, Moggio Udinese (IT); Bruno Norio, Venaria Reale (IT)

(73) Assignee: Automotive Lighting Italia S.p.A. (IT)

( * ) Notice: Subject to any disclaimer, the term of this patent is extended or adjusted under 35 U.S.C. 154(b) by 227 days.

(21) Appl. No.: 13/580,761

(22) PCT Filed: Feb. 23, 2011

(86) PCT No.: PCT/IB2011/000371
§ 371 (c)(1),
(2), (4) Date: Jan. 11, 2013

(87) PCT Pub. No.: WO2011/104615
PCT Pub. Date: Sep. 1, 2011

(65) Prior Publication Data
US 2013/0100690 A1    Apr. 25, 2013

(30) Foreign Application Priority Data
Feb. 23, 2010    (IT) .............................. TV2010A0022

(51) Int. Cl.
*B60Q 1/00*    (2006.01)
*B60Q 3/00*    (2006.01)
*B60Q 11/00*    (2006.01)
*B29D 11/00*    (2006.01)
*B29C 45/00*    (2006.01)
(Continued)

(52) U.S. Cl.
CPC ............ *B29D 11/00* (2013.01); *B29C 45/0025* (2013.01); *B29C 45/162* (2013.01);
(Continued)

(58) Field of Classification Search
USPC ............ 264/1.1–2.7; 362/459, 470, 473, 477, 362/496–497, 487, 505–507, 509, 514, 538, 362/540–542
See application file for complete search history.

(56) References Cited

U.S. PATENT DOCUMENTS 4,885,121 A * 12/1989 Patel .............................. 264/255
5,413,743 A * 5/1995 Prophet .......................... 264/1.7
(Continued)

FOREIGN PATENT DOCUMENTS

DE    102007052197    *    4/2009    .............. B29C 45/16
JP    2007216542 A    *    8/2007

OTHER PUBLICATIONS

Machine translation og JP2007-216542A.*

*Primary Examiner* — Anne Hines
*Assistant Examiner* — Jose M Diaz
(74) *Attorney, Agent, or Firm* — Matthew A. Pequignot; Pequignot + Myers LLC

(57) ABSTRACT

A method for injection molding of plastic-material lenticular bodies for lights; of motor vehicles and similar, the method comprising the steps of coupling a punch half-mold with a first matrix half-mold so as to define, on the surface of the punch half-mold, a first closed cavity that copies in reverse the shape of the first plastic-material sheet; filling said first cavity with a first plastic polymer in a liquid state, injecting the first plastic polymer in the first cavity from an injection point located at said first segment of the peripheral edge of the first plastic-material sheet; and finally separating, after the first plastic polymer has solidified to form the first plastic-material sheet, the punch half-mold from the first; matrix half-mold maintaining the first plastic-material sheet still on the surface of the punch half-mold.

11 Claims, 6 Drawing Sheets

(51) Int. Cl.
  B29C 45/16  (2006.01)
  *F21V 5/04*  (2006.01)
  B29C 45/27  (2006.01)
  B29L 11/00  (2006.01)
  B29L 31/30  (2006.01)
  B29L 31/00  (2006.01)

(52) U.S. Cl.
  CPC .. *B60Q 1/00* (2013.01); *F21V 5/04* (2013.01); *B29C 45/27* (2013.01); *B29C 2045/0027* (2013.01); *B29C 2045/1682* (2013.01); *B29L 2011/0016* (2013.01); *B29L 2031/30* (2013.01); *B29L 2031/747* (2013.01)

(56) References Cited

U.S. PATENT DOCUMENTS

| | | | | |
|---|---|---|---|---|
| 5,642,228 | A * | 6/1997 | Takezawa et al. | 359/642 |
| 5,922,369 | A * | 7/1999 | Yanagihara et al. | 425/572 |
| 6,113,254 | A * | 9/2000 | Kaneko | 362/520 |
| 6,264,869 | B1 * | 7/2001 | Notarpietro et al. | 264/247 |
| 6,439,872 | B1 * | 8/2002 | Yoshinaga et al. | 425/112 |
| 7,837,460 | B2 * | 11/2010 | Nishida | 425/395 |
| 2005/0174798 | A1 * | 8/2005 | Ikeda et al. | 362/561 |
| 2008/0018006 | A1 * | 1/2008 | Bazzo et al. | 264/1.7 |
| 2008/0138561 | A1 * | 6/2008 | Umezawa | 428/61 |

* cited by examiner

METHOD FOR INJECTION MOULDING OF PLASTIC-MATERIAL LENTICULAR BODIES FOR LIGHTS OF MOTOR VEHICLES AND SIMILAR, AND LENTICULAR BODY FOR LIGHTS OF MOTOR VEHICLES AND SIMILAR

RELATED APPLICATION DATA

This application is the national stage entry of International Appl. No. PCT/IB2011/000371, filed Feb. 23, 2011, which claims priority to Italian Patent Application No. TV2010A000022, filed on Feb. 23, 2010. All claims of priority to these applications are hereby made, and each of these applications is hereby incorporated in its entirety by reference.

TECHNICAL FIELD

The present invention relates to a method for injection moulding of plastic-material lenticular bodies for lights of motor vehicles and similar, and to a lenticular body for lights of motor vehicles and similar.

More in detail, the present invention relates to a method for injection moulding of monolayer, plastic-material lenticular bodies for lights of motor vehicles or similar, to which the following description refers purely by way of example without implying any loss of generality.

STATE OF THE ART

As known, monolayer plastic-material lenticular bodies used in manufacturing of front and rear motor-vehicle lights essentially consist of a number of plastic-material sheets of given thickness, which have locally different color, transparency degree and/or surface finish, which are arranged next to one another without reciprocally overlapping, i.e. without stratification of the sheets onto one another, and, finally, which are rigidly and continuously fixed sideways to one another so as to form a rigid, complex-three-dimensional— i.e. variously convexed-monolayer shell.

More in detail, the plastic-material sheets are usually made of transparent or semitransparent polymer, possibly also colored, and are usually shaped so as to form optical surfaces having the function of either scattering or focusing the light produced by the light sources within the motor-vehicle light, and/or clear surfaces which do not significantly modify the light propagation, and/or passive reflector surfaces which reflect incident light.

Furthermore, some plastic-material sheets may additionally, or alternatively, have the function of joining to one another plastic-material sheets having only optical function (i.e. solely provided with optical and/or clear and/or reflector surfaces); and/or of protecting the inner components of the motor-vehicle light from weathering agents; and/or of allowing the coupling of the lenticular body with the rear shell or casing of the motor-vehicle light. In case of plastic-material sheets only having structural and/or protective function for the inner components of the light, the plastic material may also be opaque.

The plastic-material sheets only having optical functional (i.e. only provided with optical and/or clear and/or retro-reflecting surfaces) are usually located inside the perimeter of the lenticular body; while the plastic-material sheets having additional structural function entirely surround all the optical-function-only plastic-material sheets, and are usually provided with a number of coupling teeth, snap locking tongues and/or other protruding, supporting and/or locking appendixes necessary for the final assembly of the motor-vehicle light.

In the beginning the monolayer lenticular bodies were produced via a separated-components injection moulding process which provides for injection moulding separately from one another the various plastic-material sheets which have optical and/or structural function and are located inside the perimeter of the lenticular body, using a number of injection moulding machines suitable for moulding small-sized pieces; and then for transferring the various plastic-material sheets to a large-size mould which copies in reverse the shape of the entire lenticular body, wherein it is then injected the plastic material that will form the last plastic-material sheet. Last sheet which is intended to join to one another the plastic-material sheets arranged inside the perimeter of the motor-vehicle light, and which is usually a plastic-material sheet with structural function.

Obviously, the plastic material which is injected into the mould cavity coping in reverse the shape of the entire lenticular body will embrace and adhere to the peripheral edge of all the plastic-material sheets already present inside the cavity, so as to permanently entrap/incorporate in a complex-shaped, rigid shell all the plastic-material sheets previously made.

Unfortunately, the need to move from one mould to another the plastic-material sheets having optical and/or structural function to complete the construction of the whole monolayer lenticular body, puts serious limits to the shape that the various plastic-material sheets may have and, therefore, to the overall shape of the monolayer lenticular body, furthermore creating surface discontinuities between two adjacent plastic-material sheets.

In order to obviate this drawback, injection moulding machines capable of moulding the whole monolayer lenticular body in a single production cycle, within a single mould, have been developed over the past years.

These machines use an injection moulding process of a multicolor sequential type, which allows to obtain, in a single moulding cycle, a rigid plastic-material shell having any shape and size and provided with a number of either transparent or semitransparent plastic-material inserts of any color and shape. This possibility is very important when the monolayer lenticular body must be used to make a motor-vehicle rear light.

In fact, according to regulations in force, the rear light of a motor vehicle must be capable of emitting red light when the brakes of the motor vehicle are applied, white light when reverse gear is engaged, amber light when the direction indicators are turned on, and finally it must also integrate a passive reflector surface.

The injection moulding machines which are capable of producing an entire monolayer lenticular body in one single moulding cycle, using the above-mentioned multicolor sequential injection moulding method, are provided with a particular mould essentially consisting of a fixed platform which is provided with a number of matrix half-moulds; and a rotating platform, which is instead provided with a punch half-mould, and is able to move with respect to the fixed platform so as to be able to couple, in rapid sequence, the punch half-mould to each matrix half-mould present on the fixed platform.

Each matrix half-mould is provided, on the coupling surface with the punch half-mould, with a surface imprint which is shaped so as to define, on the surface of the punch half-mould, a closed cavity that reverse copies the shape of a sheet of the lenticular body, or of a number of sheets of the lenticular body adjacent to one another.

Therefore, by using an adequate number of matrix half-moulds which, in sequence, define progressively larger closed cavities on the surface of the punch half-mould, all the plastic-material sheets forming the lenticular body may be formed on the surface of the punch half-mould during a single moulding cycle.

More specifically, the injection moulding machines using the multicolor sequential injection moulding method start the moulding cycle by positioning the punch half-mould in abutment against a first matrix half-mould which is provided with a surface imprint profiled so as to define, on the surface of the punch half-mould, a first closed cavity which copies in reverse the shape of one of the plastic-material sheets having optical and/or structural function and which are located inside the perimeter of the lenticular body, and then inject liquid plastic material into the above-mentioned closed cavity so as to form the first plastic-material sheet having optical and/or structural function.

When the first plastic-material sheet has solidified, the injection moulding machine separates the punch half-mould from the matrix half-mould and then couples the punch half-mould to a second matrix half-mould, holding the first plastic-material sheet on the surface of the punch half-mould. The second matrix half-mould is provided with a surface imprint which is shaped so as to define, on surface of the punch half-mould, a second closed cavity that reverse copies the shape of the first plastic sheet and of a second plastic-material sheet arranged immediately adjacent to the first sheet.

Once the coupling of the punch half-mould with the second matrix half-mould has been completed, the moulding method of the monolayer lenticular body provides for injecting the liquid plastic material into the new closed cavity, so as to fill with plastic material the part of the second cavity which is still empty (one part is occupied by the first plastic-material sheet), thus forming the second plastic-material sheet.

When also the second plastic-material sheet has solidified and has perfectly welded to the first plastic-material sheet, the injection moulding machine separates the punch half-mould from the second matrix half-mould, and then couples the punch half-mould with a possible third matrix half-mould, holding the first and second plastic-material sheets on the surface of the punch half-mould.

The third matrix half-mould is provided with a surface imprint which is obviously shaped so as to define, on the surface of the punch half-mould, a third closed cavity that reverse copies the shape of the first, second and third plastic-material sheets, the latter either surrounding or being adjacent to the first two. The third sheet may be either a plastic-material sheet with structural function or another sheet with optical function.

Once the coupling of the punch half-mould with the third matrix half-mould has been completed, the moulding method of the monolayer lenticular body provides for injecting the liquid plastic material into the new cavity, so as to fill with plastic material the part of the third cavity which is still empty (one part is occupied by the first and second plastic-material sheets), thus forming the third plastic-material sheet.

The moulding cycle of the monolayer lenticular body ends when the punch half-mould couples with the matrix half-mould that is provided with a surface imprint shaped so as to define, on the surface of the punch half-mould, a closed cavity that reverse copies the shape of the whole lenticular body, and the liquid plastic material is injected into the above-mentioned cavity. Cavity that is almost totally occupied by the previously realized plastic-material sheets.

Obviously the plastic material that is injected into the various cavities formed in rapid sequence on surface of the punch half-mould must change according to the plastic-material sheet which is to be made on the surface of the punch half-mould.

Currently, the plastic material is conveyed into the closed cavity formed on the surface of the punch half-mould, from an injection point which is located on one of the two faces of the plastic-material sheet to be made, roughly in the middle of the cavity.

Unfortunately, any lenticular bodies made via an injection moulding process have minor surface flaws, typically very small annular protrusions, at the points where the plastic material is introduced into the mould cavity. Such surface traces are usually called surface injection traces.

In case of monolayer lenticular bodies realized according to the multicolor sequential injection moulding method, the surface injection traces of the first plastic-material sheets, i.e. of the sheets made during the initial stage of the moulding cycle, tend to be formed roughly in the middle of the optical and/or clear surfaces which are used to either scatter, focus or color the light produced by the light sources present inside the motor-vehicle light, and may considerably alter the local optical properties of the sheet. The alteration of the optical properties may reach unacceptable levels when the plastic material used to make the sheet has a high transparency degree.

In order to at least partially obviate this drawback, most manufacturers of monolayer plastic-material lenticular bodies use moulds in which the openings for introducing the liquid plastic material have a very small section, so as to reduce the size of the possible surface traces. This choice usually implies the use of higher injection pressures, resulting in increased costs as well.

DISCLOSURE OF THE INVENTION

Aim of the prevent invention is to provide monolayer plastic-material lenticular bodies which are free from surface traces on the optical and/or clear surfaces, and which are further cost-effective to be manufactured.

In accordance with these aims, there is provided a method for injection moulding plastic-material lenticular bodies for lights of motor vehicles and similar, as defined in claim 1 and preferably, though not necessarily, in any one of its dependant claims.

Furthermore, according to the present invention there is provided a plastic-material lenticular body for lights of motor vehicles and similar, as defined in claim 9 and preferably, though not necessarily, in any one of its dependant claims.

BRIEF DESCRIPTION OF THE DRAWINGS

The present invention will now be described with reference to the accompanying drawings, which illustrate a non-limitative embodiment thereof, in which.

FAVORITE EMBODIMENT OF THE INVENTION

Figure 1:
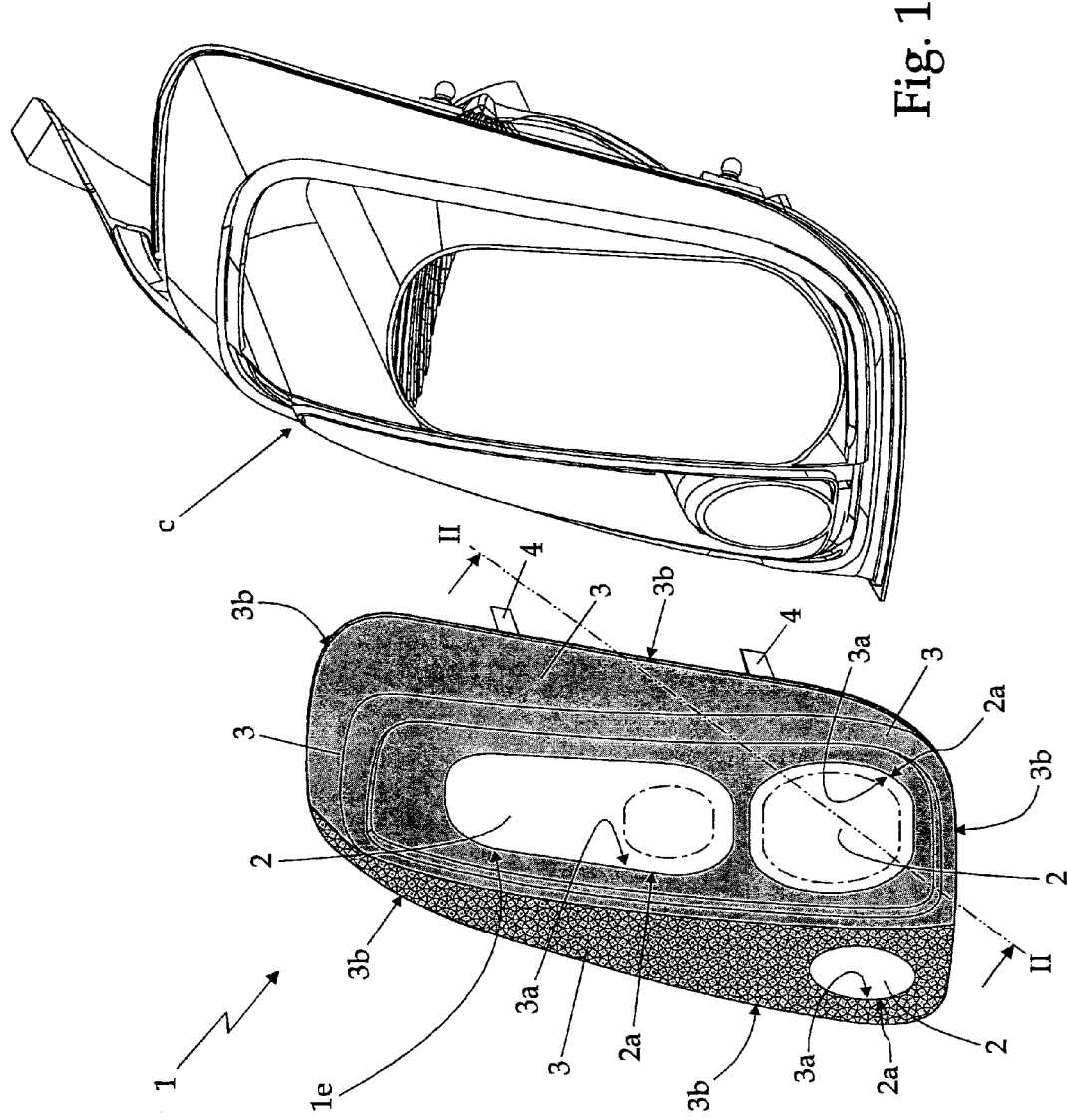
FIG. 1 shows a partially exploded axonometric view of a motor-vehicle light provided with a plastic-material lenticular body made according to the teachings of the present invention.
Figure 2:
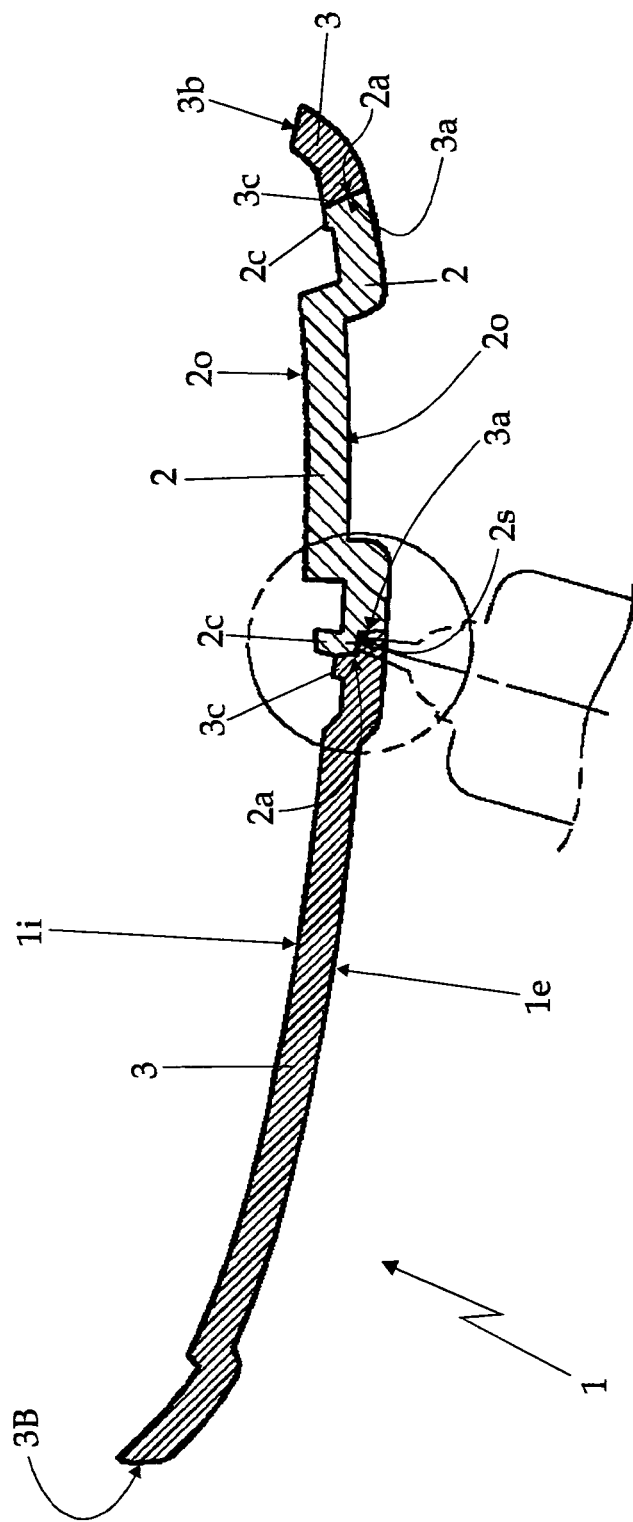
FIG. 2 is a section view of the lenticular body shown in FIG. 1, taken along line II-II and with parts removed for clarity.

With reference to FIGS. 1 and 2, number 1 indicates as a whole a plastic-material lenticular body, specifically structured to be used when manufacturing front and rear motor-vehicle lights or similar.

Lenticular body 1 consists of a complex-three-dimensional shape, rigid plastic-material shell which is adapted to be coupled to the rear body or casing c of the motor-vehicle light so as to cover the light sources (not shown) which are housed within the rear casing c of the motor-vehicle light, and which is provided with an inner face 1i intended to face the light sources of the motor-vehicle light, and with an outer face 1e which is instead seen from the outside when the light is recessed in the bodywork of the motor vehicle or similar.

More in detail, lenticular body 1 essentially consists of a number of plastic-material sheets 2, 3 of predetermined thickness, which are arranged side by side without reciprocal overlapping, and are rigidly and continuously fixed sideways to one another, so as to form a complex-three-dimensional shaped, rigid monolayer shell having the thickness locally equal to that of the single plastic-material sheets 2, 3.

The plastic-material sheets 2, 3 are made of transparent, semitransparent or opaque polymer, and locally differ from one another by surface finishing and/or by the transparency degree and/or by the color of the plastic polymer they are made of. The edge of each plastic-material sheet 2, 3 is further locally shaped so as to perfectly match with, and perfectly adhere to, the corresponding edge of the immediately adjacent sheet 2, 3, along the whole length of the border line between the two sheets.

More in detail, some plastic-material sheets 2, 3 are made of transparent or semitransparent polymer, optionally even colored, and are profiled so as to form optical surfaces having the function of either scattering or focusing the light produced by the light sources present inside the motor-vehicle light, and/or clear surfaces which do not significantly modify the propagation of light, and/or passive reflector surfaces which reflect the incident light; whereas other plastic-material sheets 2, 3 are made of either transparent, semitransparent or opaque polymer, optionally also colored, and have only or also the function of joining to one another the plastic-material sheets 2, 3 with optical function only (i.e. provided with only optical and/or clear and/or reflector surfaces) and/or of protecting the components inside the motor-vehicle light from weathering agents.

In particular, in the example shown, the plastic-material lenticular body 1 is formed by at least one plastic-material sheet 2 having only optical function (three in the example shown) and which is made of either transparent or semitransparent plastic polymer, optionally also colored, and is preferably, though not necessarily, shaped so as to form optical surfaces 2o having the function of either scattering or focusing the light produced by the light sources present inside the motor-vehicle light, and to form clear surfaces which do not significantly modify the propagation of light; and by at least one plastic-material sheet 3 with optical and structural function (only one in the example shown) which is made of an either transparent or semitransparent plastic polymer different from that forming sheet 2, and which is adapted to at least partially incorporate inside itself the sheet(s) 2 only having optical function, so as to join the sheets 2 to one another while completing the complex-three-dimensional shaped, rigid monolayer.

Unlike the sheets 2 with optical function only, sheet 3 is however preferably, though not necessarily, shaped so as to form clear surfaces only that do not significantly modify the propagation of light, and passive reflector surfaces which reflect incident light.

In the example shown, in particular, the plastic polymer forming the sheets 2 with optical function only is a colorless transparent plastic polymer, while the plastic polymer forming the sheet 3 with optical and structural function is a preferably, though not necessarily, red colored, semitransparent plastic polymer.

Preferably, though not necessarily, the three sheets 2 with optical function are furthermore located inside the outer perimeter of lenticular body 1, while the sheet 3 with optical and structural function completely surrounds the sheets 2 with optical function only, and preferably, though not necessarily, also provided with one or more coupling teeth, snap locking tongues and/or other protruding supporting and/or locking appendixes required for the final assembly of the motor-vehicle light, globally indicated by number 4.

In other words, with reference to FIG. 1, in the example shown the sheet 3 with optical and structural function is provided with three windows or pass-through openings, each of which reverse copies the shape of a respective sheet 2 with optical function only, so that the outer peripheral edge 2a of each sheet 2 may perfectly match with the inner peripheral edge 3a of the sheet 3 defining the corresponding window or pass-through opening, over the whole length of the aforesaid peripheral edge 3a, while the outer peripheral edge 3b of the plastic-material sheet 3 with optical and structural function forms the outer periphery of lenticular body 1.

Figure 3:
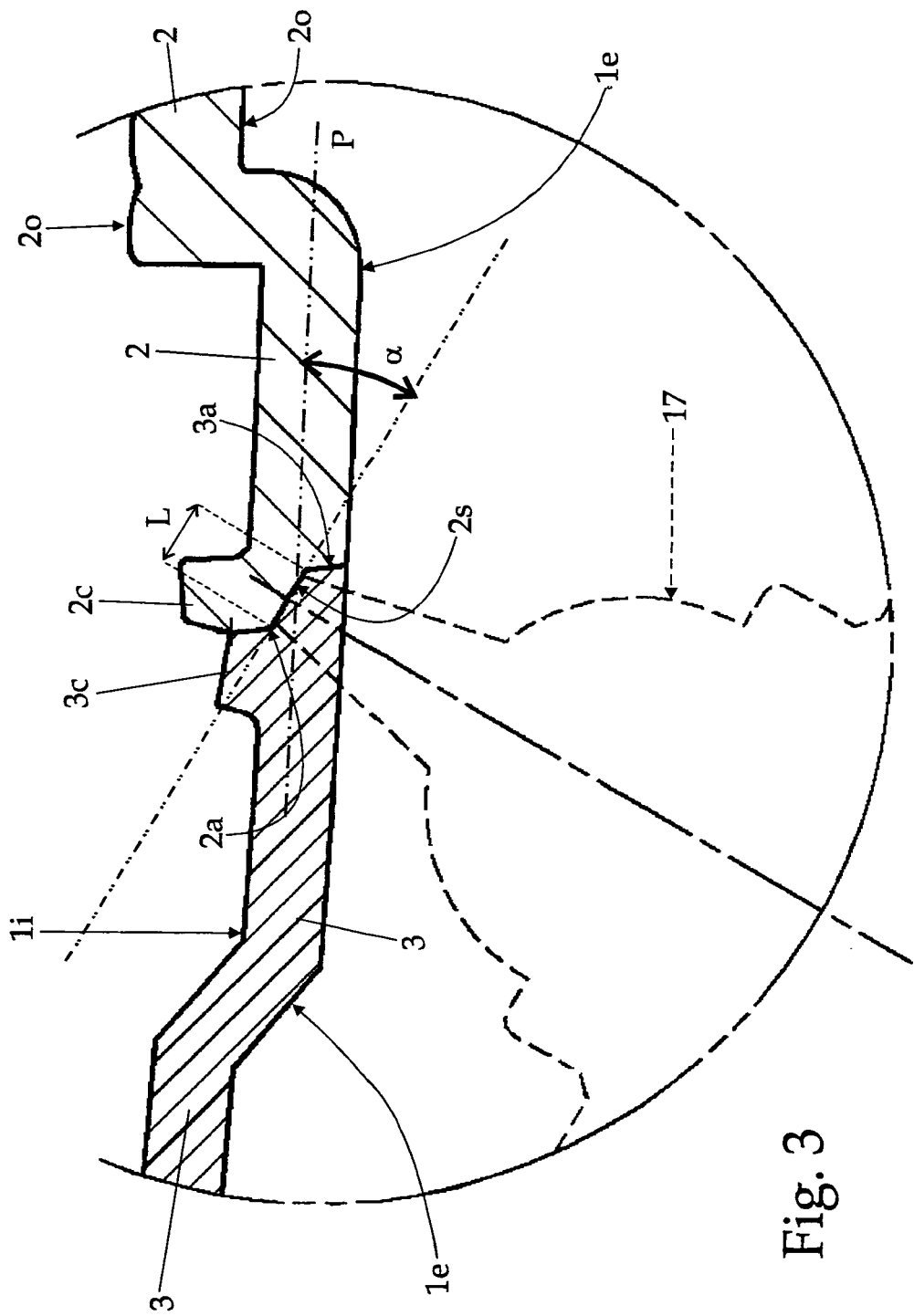
FIG. 3 shows, in enlarged scale, a FIG. 2 detail.

With reference to FIGS. 2 and 3, unlike currently known monolayer lenticular bodies, at least one segment of the outer peripheral edge 2a of each sheet 2 with optical function that perfectly matches with, and is completely covered by, a corresponding segment of the inner peripheral edge 3a of the sheet 3 with optical and structural function, is profiled so as to have a substantially S-shaped, curvilinear transversal profile; and it is furthermore provided with a flatten portion 2s which is roughly obtained at the centre of the substantially S-shaped, curvilinear transversal profile, i.e. at the inflection point of the substantially S-shaped, curvilinear transversal profile. The width L of the flatten portion 2s is preferably, though not necessarily, smaller than or equal to 4 millimeters, and is however less than 20 millimeters.

The surface flaw or surface injection trace (not shown), typically a small protrusion of annular shape made on the sheet during the injection moulding process, is located on the flatten portion 2s of the outer peripheral edge 2a of sheet 2.

Preferably, though not necessarily, the flatten portion 2s is inclined by a predetermined angle α with respect to a local laying plane P of the rigid shell, i.e. with respect to the local laying plane of lenticular body 1 and to the two faces of the latter.

In the example shown, in particular, the whole peripheral edge 2a of the sheet 2 with optical function is profiled so as to have a substantially S-shaped, transversal curvilinear profile, while the flatten portion 2s is realized on a substantially rectilinear segment of the peripheral edge 2a of sheet 2.

Furthermore, the tilt angle α of the flatten portion 2s is preferably, though not necessarily, between 20 and 50 degrees, and is however between 0 and 90 degrees.

In the example shown, in particular, the tilt angle α of flatten portion 2s with respect to the local laying plane P of rigid shell 1 is equal to about 30 degrees.

With reference to FIGS. 2 and 3, each plastic-material sheet 2 having optical function only is finally preferably, though not necessarily, also provided with a peripheral crest or ridge 2c, which protrudes from the rear face of sheet 2, i.e. from the face concurring to forming the inner face 1i of lenticular body 1, next to the outer peripheral edge 2a of the same sheet 2 with optical function. The peripheral crest or ridge 2c has the function of maintaining the sheet 2 with optical function stationary onto the surface of the punch half-mould when detaching the punch half-mould from the matrix half-mould.

As previously mentioned, with reference to FIGS. 1, 2 and 3, the sheet 3 with optical and structural function is provided with three pass-through openings, each of which reverse copies the shape of the perimeter of a respective sheet 2 having optical function only, while the inner peripheral edge 3a of the sheet which defines each window or pass-through opening is shaped so as to reverse copy the shape of the peripheral edge 2a of the corresponding sheet 2 with optical function, thus integrally covering the flatten portion 2s of the peripheral edge 2a and the surface injection trace placed thereon.

Alike the two sheets 2 with optical function, also the sheet 3 with structural function is preferably, though not necessarily, provided with two peripheral crests or ridges 3c which protrudes from the rear face of sheet 3, i.e. the face concurring to forming the inner face 1i of lenticular body 1, next to the inner peripheral edges 3a of the sheet and/or next to the outer peripheral edge 3b of the same sheet.

Figure 4:
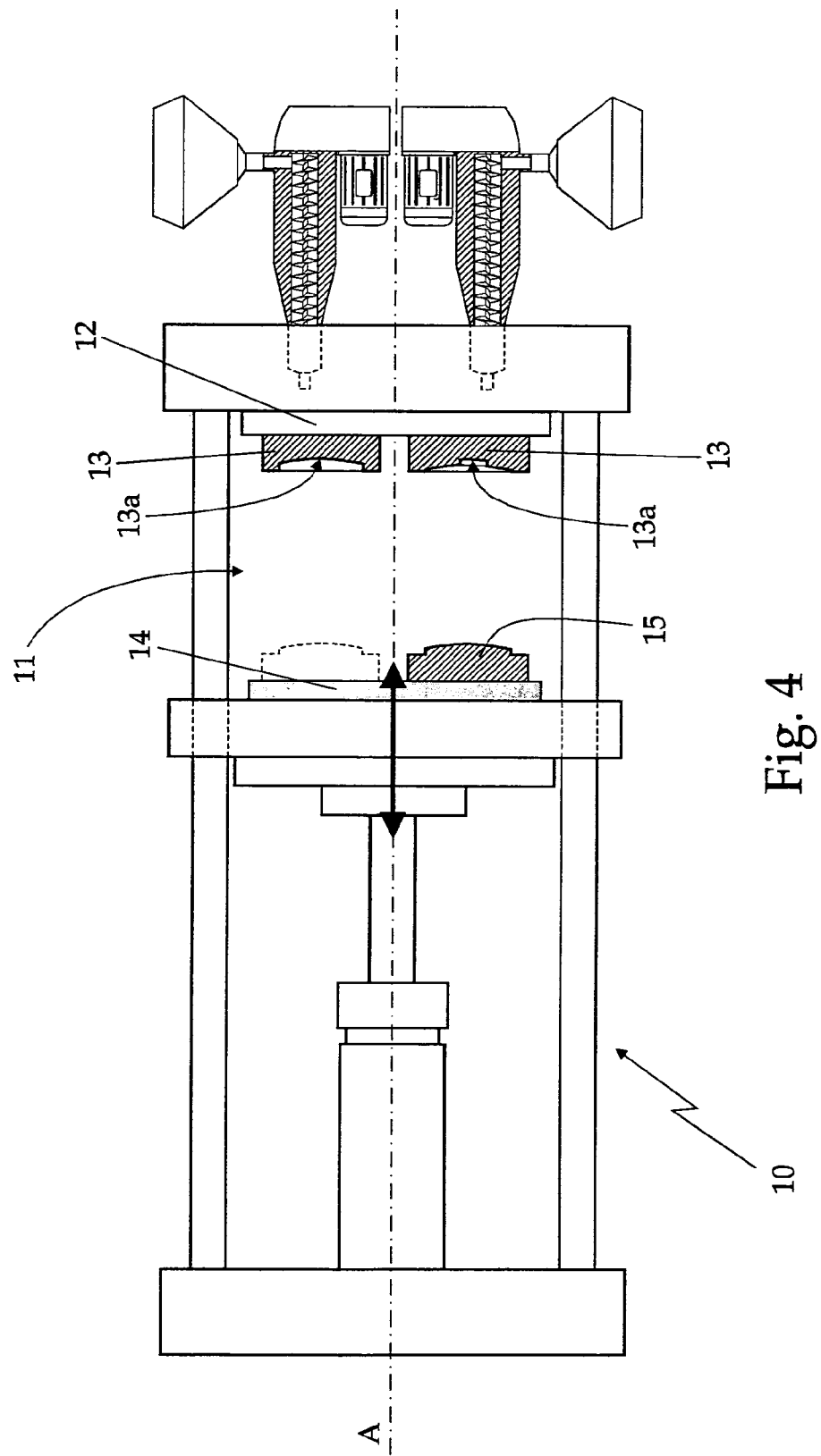
FIG. 4 schematically shows an injection moulding machine of multicolor sequential type which operates according to the teachings of the present invention; whereas FIGS. 5 and 6 schematically show a detail of the FIG. 4 injection moulding machine into two different steps of the moulding cycle of the plastic-material lenticular body shown in FIGS. 1, 2 and 3.
Figure 5:
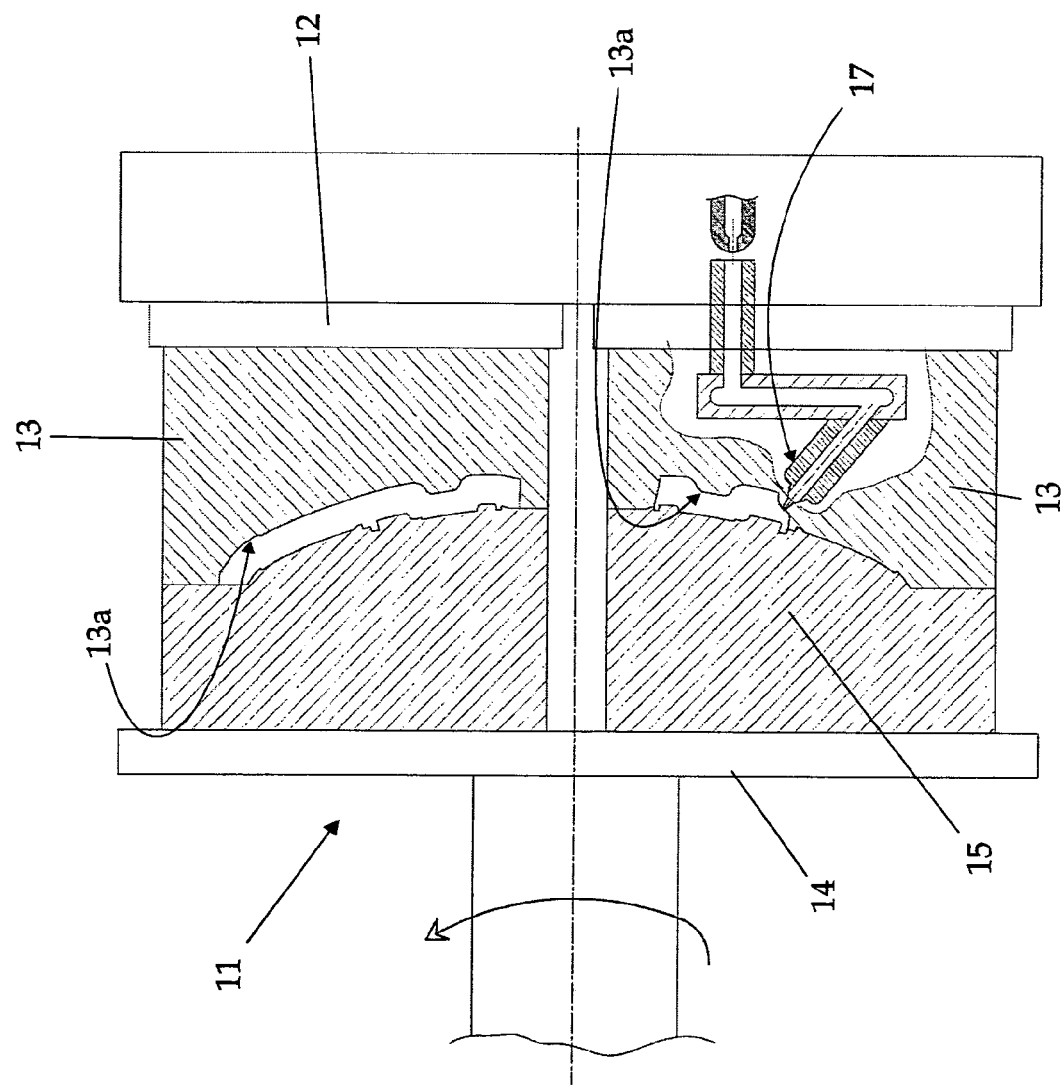
Figure 6:
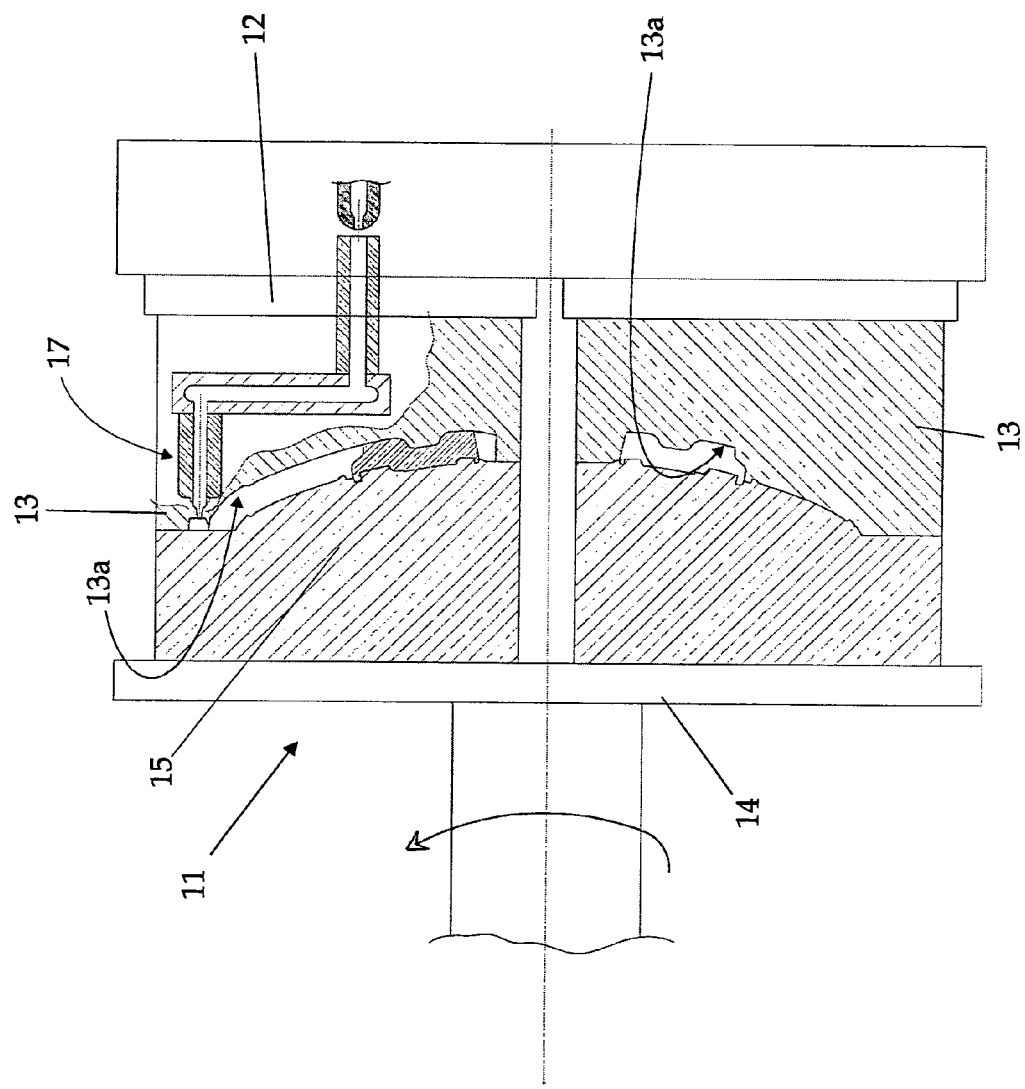

With reference to FIGS. 4, 5 and 6, the lenticular body 1 is obtained by means of an injection moulding machine 10 of multicolor sequential type, which is provided with a mould 11 for multicolor sequential moulding, traditionally called "rotating table mould", which essentially consists of a fixed platform 12 provided with a number of matrix half-moulds 13; and of a movable platform 14, which is arranged parallel and facing the fixed platform 12, is provided with a punch half-mould 15, and is capable of rotating with respect to the fixed platform 12 about the longitudinal axis A of the machine, so as to align and then couple in known manner the punch half-mould 15 in rapid sequence with each matrix half-mould 13 on the fixed platform 12. The movable platform 14 obviously moves to and from the fixed platform 12 following a rectilinear trajectory locally parallel to the longitudinal axis A of the machine.

On the coupling surface with the punch half-mould 15, each matrix half-mould 13 is provided with at least one surface imprint 13a that is shaped so as to define, on the surface of the punch half-mould 15, a closed cavity which reverse copies the shape of a sheet of the lenticular body 1, or a number of reciprocally adjoining sheets of the lenticular body 1.

In the example shown, in particular, the three sheets 2 with optical function only are made of the same plastic polymer, whereby they may be simultaneously realized on the surface of the punch half-mould 15.

In this case, assuming that the two sheets 2 with optical function are spaced from one another, the fixed platform 12 may be provided with two matrix half-moulds 13 only. The first matrix half-mould 13 is provided with three surface imprints 13a, each of which is profiled so as to define a closed cavity on the surface of the punch half-mould 15, a respective cavity that copies in reverse the shape of a corresponding sheet 2 with optical function; whereas the second matrix half-mould 13 is provided with only one surface imprint 13a shaped so as to define, on surface of the punch half-mould 15, a closed cavity that reverse copies the shape of the entire lenticular body 1, i.e. the whole of sheets 2 and 3.

However, unlike the currently known "rotating table" moulds, the injectors 17 which controls the injection of the liquid-state pressurized plastic polymer into the closed cavity formed on surface of the punch half-mould 15, are placed on the first matrix half-mould 13 (i.e. on the matrix half-mould 13 with which the first plastic-material sheet(s) of lenticular body 1 are formed), so as to inject the plastic polymer into the closed cavity at the flatten portion 2s present on the outer peripheral edge 2a of the plastic-material sheet 2.

Thereby, the surface flaw or surface injection trace is located exactly on the flatten portion 2s of the outer peripheral edge 2a of sheet 2.

More in detail, injectors 17 are arranged so that the longitudinal axis thereof is locally substantially perpendicular to the flatten portion 2s present on the outer peripheral edge 2a of the plastic-material sheet 2 with optical function only.

With reference to FIGS. 5 and 6, the plastic-material lenticular body 1 is realized via an injection moulding method which, within only one moulding cycle, comprises in sequence:

the step of coupling the punch half-mould 15 with the first matrix half-mould 13 provided with the three surface imprints 13a, so as to define, on surface of the punch half-mould 15, three first closed cavities which copy in reverse the shape of the three plastic-material sheets 2 with optical function only;

the step of filling, with a first liquid-state plastic polymer, the three first closed cavities provided on the surface of the punch half-mould 15 by the first matrix half-mould 13, injecting the first plastic polymer into the three cavities from an injection point located at the flatten portion 2s present on the peripheral edge 2a of sheet 2;

the step of separating the punch half-mould 15 from the matrix half-mould 13, after the plastic polymer which forms both the sheets 2 with optical function, is solidified to form the three plastic-material sheets 2 with optical function only, maintaining the three plastic-material sheets 2 stationary on the surface of the punch half-mould 15;

the step of coupling the punch half-mould 15 with the second matrix half-mould 13 so as to define, on surface of the punch half-mould 15, a second closed cavity which reverse copies the shape of the three plastic-material sheets 2 with optical function only and of the plastic-material sheet 3 with optical and structural function, placing the three previously formed, plastic-material sheets 2 within the second cavity;

the step of filling, with a second liquid state plastic polymer, the second closed cavity realized on surface of the punch half-mould 15 by the second matrix half-mould 13, so as to completely cover the outer peripheral edge 2a of sheet 2 and hide the surface injection trace previously realized on the flatten surface 2s of the same peripheral edge 2a, injecting the second plastic polymer into the cavity from an injection point preferably, though not necessarily, localized at the outer peripheral edge 3b of the sheet 3 with structural function;

the step of separating the punch half-mould 15 from the second matrix half-mould 13, after the second plastic polymer has solidified to form the second plastic-material sheet 3 with optical and structural function and has welded to the first plastic-material sheet 2 with optical function only thus forming the lenticular body 1, while maintaining the three sheets 2 with optical function only and the sheet 3 with optical and structural function stationary on surface of the punch half-mould 15; and finally the step of removing lenticular body 1 from the surface of the punch half-mould 15.

Obviously, if the lenticular body 1 were formed by only two plastic-material sheets 2 and 3 with optical and/or structural function, the first matrix half-mould 13 would be obviously provided with only one surface imprint 13a appropriately shaped so as to define, on surface of the punch half-mould 15, a closed cavity that reverse copies the shape of the first plastic-material sheet 2 to be made.

It is evident that the above-described moulding method may be easily modified to provide, again by means of multi-color sequential injection moulding, also a lenticular shell 1 in which the three plastic-material sheets 2 with optical function are adjacent to one another and are made with three different plastic polymers.

In this case, the fixed platform 12 of mould 11 will be provided with four matrix half-moulds 13. The first matrix half-mould 13 will be provided with a surface imprint 13a shaped so as to define, on surface of the punch half-mould 15, a first closed cavity which reverse copies the shape of a first sheet 2 with optical function only; the second matrix half-mould 13 will be provided with a surface imprint 13a shaped so as to define, on surface of the punch half-mould 15, a second closed cavity which reverse copies the shape of the first and second sheets 2 with optical function only; the third matrix half-mould 13 will be provided with a surface imprint 13a shaped so as to define, on surface of the punch half-mould 15, a third closed cavity which reverse copies the shape of the first, second and third sheets 2 with optical function only; while the fourth matrix half-mould 13 is provided with a surface imprint 13a shaped so as to define, on the surface of the punch half-mould 15, a closed cavity which reverse copies the shape of the entire lenticular body 1, i.e. the whole of sheets 2 and 3.

In this case, the punch half-mould 15 will be coupled with the first matrix half-mould 13 and then, in rapid sequence, with the second, the third and the fourth matrix half-moulds 13.

In this variation, once the first sheet 2 with optical function only has been realized and the punch half-mould 15 has been moved in abutment on the second matrix half-mould 13 while holding the first plastic-material sheet 2 on surface of the punch half-mould 15, the moulding cycle obviously provides for injecting the liquid-state plastic polymer into the second closed cavity from an injection point located at the flatten portion 2s of the peripheral edge 2a of the second plastic-material sheet 2.

The advantages correlated to the use of the above-described injection moulding method are large in number.

Firstly, the surface injection traces that are formed on lenticular body 1, are moved to the peripheral edges 2a of the plastic-material sheets 2, where they cannot compromise the quality of the optical surfaces 2o intended to be made on lenticular body 1.

Moreover, placing the injection points on the edge of the sheets 2 with optical function—which edge is then covered and hidden by the peripheral edge 3a of the sheets 3 having optical and structural function—allows to provide moulds in which the liquid plastic material injection mouths have a greater passage section, thus allowing to considerably lower the feeding pressure of the plastic material, with the consecutive cost reduction.

Furthermore, locating the surface injection traces on the side edge of the plastic-material sheets 2, 3 avoids localized thermal stress points from arising on the faces of the plastic-material sheet during the normal operation of the motor-vehicle light. Thermal stress that also may occasionally cause the breakage of the plastic-material sheet in traditional lenticular bodies.

Clearly, changes may be made to the above described and illustrated method for injection moulding of lenticular bodies for lights of motor vehicles and similar, without however departing from the scope of the present invention For example, in a non shown variation, the lenticular body 1 may be also provided with a peripheral frame made of a preferably, though not necessarily opaque, plastic-material, which is realized via super-injection directly onto the peripheral edge of the monolayer rigid shell formed by the plastic-material sheets 2 and 3.

The invention claimed is:

1. Method for injection moulding of plastic-material lenticular bodies (1) for lights of motor vehicles and similar, wherein said lenticular bodies (1) are formed by at least a first (2) and at least a second plastic-material sheet (3), which are arranged side by side without reciprocal overlapping and are rigidly and continuously fixed sideways to one another, so as to form a rigid monolayer shell (1); at least a first segment of the peripheral edge (3a) of the second plastic-material sheet (3) being locally profiled so as to match with, and adhere to, a corresponding first segment of the peripheral edge (2a) of the first plastic-material sheet (2), along the whole length of the border line between the two sheets; the method being characterized by comprising, in sequence:

the step of coupling a punch half-mould (15) with a first matrix half-mould (13) so as to define, on surface of the punch half-mould (15), a first closed cavity that copies in reverse the shape of the first plastic-material sheet (2);

the step of filling said first cavity with a first plastic polymer in a liquid state, injecting the first plastic polymer in the first cavity from an injection point located by said first segment of the peripheral edge (2a) of the first plastic-material sheet (2);

the step of separating, after the first plastic polymer has solidified to form the first plastic-material sheet (2), the punch half-mould (15) from the first matrix half-mould (13) maintaining the first plastic-material sheet (2) still on the surface of said punch half-mould (15);

the step of coupling the punch half-mould (15) with a second matrix half-mould (13) so as to define, on surface of the punch half-mould (15), a second closed cavity that copies in reverse the shape of the first (2) and second plastic—material sheet (3), positioning the first plastic-material sheet (2) in said second cavity;

the step of filling the second cavity with a second plastic polymer in a liquid state, so that the second plastic polymer completely covers said first segment of the peripheral edge (2a) of the first plastic-material sheet (2), so as to hide the surface injection trace present in said first plastic-material sheet (2); and the step of separating the punch half-mould (15) from the second matrix half-mould (13), after the second plastic polymer has solidified to form the second plastic-material sheet (3) and is welded to the first plastic-material sheet (2).

2. Method for injection moulding of lenticular bodies according to claim 1, characterized in that the first matrix half-mould (13) is provided with at least one surface imprint (13a) which is profiled so as to define, on surface of the punch half-mould (15), said first closed cavity which copies in reverse the shape of the first plastic-material sheet (2); and in that the second matrix half-mould (13) is provided with at least one surface imprint (13a) which is profiled so as to define, on the surface of the punch half-mould (15), a second closed cavity which copies in reverse the shape of the first (2) and the second plastic-material sheet (3).

3. Method for injection moulding of lenticular bodies according to claim 1, characterised in that the first segment of the peripheral edge (2a) of the first plastic-material sheet (2) has a substantially S-shaped transversal curvilinear profile.

4. Method for injection moulding of lenticular bodies according to claim 3, characterized in that the first segment of the peripheral edge (2a) of the first plastic-material sheet (2) with substantially S-shaped transversal curvilinear profile, is also provided with a flatten portion (2s) realized roughly at the centre of said substantially S-shaped transversal curvilinear profile; the injection point of the first plastic polymer being located at said flatten portion (2s).

5. Method for injection moulding of lenticular bodies according to claim 4, characterized in that the flatten portion (2s) present on the peripheral edge (2a) of the first plastic-material sheet (2) is tilted, with respect to the local laying plane (P) of the lenticular body (1), by an angle (cc) ranging between 0 and 90 degrees.

6. Method for injection moulding of lenticular bodies according to claim 5, characterized in that the flatten portion (2s) present on the peripheral edge (2a) of the first plastic-material sheet (2) is tilted, with respect to the local laying plane (P) of the lenticular body (1), by an angle (α) ranging between 20 and 50 degrees.

7. Method for injection moulding of lenticular bodies according to claim 4, characterized in that the flatten portion (2s) present on the peripheral edge (2a) of the first plastic-material sheet (2) has a width (L) smaller than 20 millimeters.

8. Method for injection moulding of lenticular bodies according to claim 1, characterized in that the second plastic polymer is injected in the second cavity from an injection point located by the peripheral edge (3b) of the second plastic-material sheet (3).

9. Lenticular body (1) for lights of motor vehicles and similar of the type formed by at least a first (2) and at least a second plastic-material sheet (3), which are arranged side by side without reciprocal overlapping, and are rigidly and continuously fixed sideways to one another, so as to form a rigid monolayer shell (1); at least a first segment of the peripheral edge (3a) of the second plastic-material sheet (3) being locally profiled so as to match with, and adhere to, a corresponding first segment of the peripheral edge (2a) of the first plastic-material sheet (2), along the whole length of the border line between the two sheets; the lenticular body (1) being characterized in that said first segment of the peripheral edge (2a) of the first plastic-material sheet (2) has a substantially S-shaped transversal curvilinear profile, and is provided with a flatten portion (2s) obtained substantially at the centre of said substantially S-shaped transversal curvilinear profile; said flatten portion (2s) being tilted, with respect to the local laying plane (P) of the lenticular body (1), by an angle (α) ranging between 20 and 50 degrees.

10. Lenticular body according to claim 9, characterized in that the flatten portion (2s) present on the peripheral edge (2a) of the first plastic-material sheet (2) has a width (L) smaller than 20 millimeters.

11. A light for a motor vehicle or similar comprising a plastic-material lenticular body (1); said light for a motor vehicle being characterized in that the plastic-material lenticular body (1) is made according to claim 1.

\* \* \* \* \*